(12) United States Patent
Kilian et al.

(10) Patent No.: US 6,600,331 B2
(45) Date of Patent: Jul. 29, 2003

(54) METHOD AND DEVICE FOR MEASURING A TEMPERATURE IN AN ELECTRONIC COMPONENT

(75) Inventors: Volker Kilian, München (DE); Richard Roth, Unterhaching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/158,271

(22) Filed: May 30, 2002

(65) Prior Publication Data

US 2002/0180472 A1 Dec. 5, 2002

(30) Foreign Application Priority Data

May 30, 2001 (DE) .......................... 101 26 300

(51) Int. Cl.$^7$ ............................................ G01R 31/02
(52) U.S. Cl. ..................... 324/760; 324/158.1
(58) Field of Search .................. 324/76.52, 760, 324/158.1; 374/163, 164, 165, 169, 210, 182, 178; 327/83, 138, 512, 513; 713/300, 310, 320, 321, 330, 340; 702/130–132; 257/467, 469, 470, 31.131

(56) References Cited

U.S. PATENT DOCUMENTS

| | | | |
|---|---|---|---|
| 3,344,671 A | | 10/1967 | Gordy et al. |
| 3,605,015 A | * | 9/1971 | Copeland, III .............. 324/766 |
| 5,168,503 A | * | 12/1992 | Maeda ......................... 372/22 |
| 6,161,003 A | * | 12/2000 | Lo Curto et al. ........... 455/260 |

FOREIGN PATENT DOCUMENTS

| | | |
|---|---|---|
| DE | 197 54 351 C1 | 8/1999 |
| EP | 0 414 052 A1 | 2/1991 |

* cited by examiner

*Primary Examiner*—Kamand Cuneo
*Assistant Examiner*—Tung X. Nguyen
(74) *Attorney, Agent, or Firm*—Laurence A. Greenberg; Werner H. Stemer; Ralph E. Locher

(57) ABSTRACT

The invention relates to a method for measuring the junction temperature in an electronic component. A periodic test signal is led via a signal path inside the component in order to obtain an internal signal. There is a frequency and/or phase relationship between the periodic test signal and a periodic external signal. A phase shift is measured between the internal signal and the external signal. The junction temperature is determined over the component region determined by the signal path as a function of the phase shift.

12 Claims, 1 Drawing Sheet

METHOD AND DEVICE FOR MEASURING A TEMPERATURE IN AN ELECTRONIC COMPONENT

BACKGROUND OF THE INVENTION

Field of the Invention

The invention relates to a method and device for measuring a temperature when testing an electronic component.

The component parameters must be determined when testing an electronic component. However, the majority of the component parameters are temperature-dependent. Particular significance is given to the temperature that prevails at the location of the electronic component that is relevant for the respective component parameter. This temperature is termed junction temperature. In the case of integrated modules, this is a temperature in a specific region of the substrate in which the electronic circuits relevant for determining the component parameters are situated.

The junction temperature cannot be measured straightaway, because it is difficult to mount a temperature sensor at the relevant point of the chip, particularly after the chip has been inserted in a housing, and in addition, the component parameters are frequently determined from a plurality of regions on the chip. It is impracticable as a rule to mount sensors on all of these regions. The respective component parameter is a function of a chip temperature at the regions on the chip that are decisive for the respective component parameter.

In measurement methods known to date, the chip is exposed to an ambient temperature and it is assumed using an approximation that the temperature at the relevant regions on the chip corresponds to the ambient temperature. However, during operation of the integrated circuit heat is generated on the chip. The result is to increase the temperature in the active regions in comparison with the ambient temperature. Particularly in the case of consecutive measurements, the integrated circuit remains essentially continuously in use, and so the temperature on the chip rises in a non-negligible way in comparison with the ambient temperature. A further disadvantage is that the degree of heating of the chip cannot be determined.

SUMMARY OF THE INVENTION

It is accordingly an object of the invention to provide a device and a method for measuring the junction temperature in an electronic component which overcome the above-mentioned disadvantages of the prior art devices and methods of this general type.

With the foregoing and other objects in view there is provided, in accordance with the invention, a method for measuring a temperature in an integrated semiconductor component, that includes steps of: obtaining an internal signal by applying a periodic test signal to a signal path that is internally configured in the semiconductor component; ensuring that there is a relationship, selected from the group consisting of a frequency relationship and a phase relationship, between the periodic test signal and a periodic external signal; measuring a phase shift between the internal signal and the external signal; and using the phase shift to determine an average temperature in a component region determined by the signal path.

In accordance with the method for measuring a temperature in an electronic component, a periodic test signal is led via a signal path inside the component in order to obtain an internal signal. There is a frequency and/or phase relationship between the periodic test signal and a periodic external signal. A phase shift is measured between an internal signal and an external signal. The temperature averaged over the component region selected by the signal path is determined from the phase shift. The temperature is preferably a junction temperature of the relevant component region.

The invention is based on the finding that because of switching speeds of the gates, the signal propagation times in the component interior are a function of the temperature prevailing there. The invention uses this dependence in order to measure the junction temperature when testing electronic components. This is advantageous, in particular, because of the fact that the junction temperature is difficult to measure from the outside and differs from the ambient temperature by a not exactly quantifiable value because of heat that is developed inside the electronic component.

The method now advantageously renders it possible to determine a mean junction temperature of the regions through which an internal signal is led. The internal signal is advantageously led through the component via a signal path such that it substantially traverses the region or regions relevant for determining the component parameters. It is frequently sensible to use a functional signal path, which is already present in any case in the chip, as the signal path so that additional chip area is not required for an additional signal path.

An average value is determined from the phase shift between the external signal and the internal signal, in order to average therefrom fluctuations in the phase shift because of jitter effects or other ones. An averaged value for the junction temperature can be determined in this way over the selected chip region.

With the foregoing and other objects in view there is provided, in accordance with the invention, a combination including: an integrated semiconductor component having an internally configured signal path obtaining an internal periodic signal from a periodic test signal applied thereto; and a device for measuring a temperature in the semiconductor component. The device includes a phase-sensitive element having a first input receiving an external periodic signal and a second input receiving the internal periodic signal from the semiconductor component. The phase-sensitive element has an output providing a variable corresponding to a time-averaged phase shift between the external periodic signal and the internal periodic signal from the semiconductor component. The time-averaged phase shift corresponds to an average temperature of a component region determined by the signal path in the electronic component. A frequency relationship or a phase relationship exists between the periodic test signal and the external periodic signal.

In accordance with an added mode of the invention, the phase-sensitive element is preferably for measuring a junction temperature in an electronic component.

The first input of the phase-sensitive element is connected to an external periodic signal, and the second input is connected to an internal periodic signal. The internal signal is in this case a periodic test signal led via a signal path inside the component. There is a frequency and/or phase relationship between the periodic test signal and a periodic external signal. The phase-sensitive element outputs, at an output, a variable that corresponds to the time-averaged phase shift between an external signal and a signal inside the component. The time-averaged phase shift corresponds to a temperature that is averaged over a component region selected by the signal path in the electronic component. The time-averaged phase shift corresponds to a junction temperature, averaged over the signal path, in the electronic component.

The device has the advantage that it renders it possible to measure the junction temperature in an electronic component in a simple way. Whereas previously, the junction temperature has been derived from the ambient temperature to which the electronic component is exposed, the device enables the junction temperature to be determined essentially exactly at the instant of a measurement of a component temperature. Particularly in the case when measuring a plurality of parameters of an electronic component, the electronic component is connected to the supply voltage for a lengthy period. The result is that the electronic component is heated entirely or partially in comparison with the ambient temperature. That is to say, it is now possible when measuring a plurality of electronic component parameters within a short time after applying a supply voltage to the electronic component, to make the assumption that the junction temperature corresponds to the ambient temperature. In the case of directly consecutive measurements of component parameters, the component parameters measured later are therefore measured at a junction temperature differing from the ambient temperature.

The inventive device now permits the junction temperature to be determined exactly at any time, that is to say even after a lengthy application of the supply voltage to the electronic component. Moreover, it is advantageous that the junction temperature can be determined in a simple way when testing the integrated circuit simply by measuring an electric variable. The electric variable can be measured using the testing device without the need to provide an additional measuring circuit.

The internal signal is advantageously formed in this case from the external signal, and so the internal and external signals have the same frequency, and a defined phase relationship arises. In this case, the internal signal is preferably led via a signal path through the electronic component. The average junction temperature is determined as a result from the individual junction temperature of the regions through which the signal path runs. When the internal signal is derived from the external signal, it is particularly advantageous that the synchronization of the internal signal with respect to the external signal is eliminated.

It is advantageous to tune the measurement in order to be able to determine the junction temperature more exactly. For this purpose, the phase shift is measured at a predetermined temperature. The predetermined temperature acts on the switched-off component until the latter has continuously assumed the predetermined temperature. The phase shift is preferably measured immediately after the application of the supply voltage to the electronic component so that it is possible to assume a junction temperature that corresponds substantially to the ambient temperature.

This yields the respective phase shift at the predetermined temperature. By applying known physical laws, or else by interpolation (after a measurement of one or more further phase shifts at one or more further temperatures), it is possible to determine a functional relationship that permits the junction temperature to be determined for each measured phase shift.

In accordance with an added feature of the invention, it is provided that the internal and the external signals are led via a phase detector for the purpose of measuring the phase shift. The phase detector is designed in its simplest form as an exclusive-OR circuit. A periodically pulsed signal is yielded at the output of the phase detector in accordance with the phase shift. The length of time of the periodic pulse (for example duration of the high level) corresponds to the magnitude of the phase shift. In order to determine a mean value of the phase shift, this periodically pulsed signal is preferably low-pass filtered in order to obtain an output signal with an essentially uniform value. Using the magnitude of the output signal, the mean phase shift, and thus the averaged junction temperature can be read out. This embodiment has the advantage that it can be of simple design.

In accordance with an additional feature of the invention, the phase-sensitive element is integrated into the electronic component. The electronic component is capable of outputting an electric variable or else a digital variable as a function of the measured phase shift. It is advantageously possible in this way to determine the junction temperature in the interior of the electronic component by measuring an electric variable at an output of the electronic component. There is then no further need for an additional external circuit.

Other features which are considered as characteristic for the invention are set forth in the appended claims.

Although the invention is illustrated and described herein as embodied in a method and device for measuring a temperature in an electronic component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
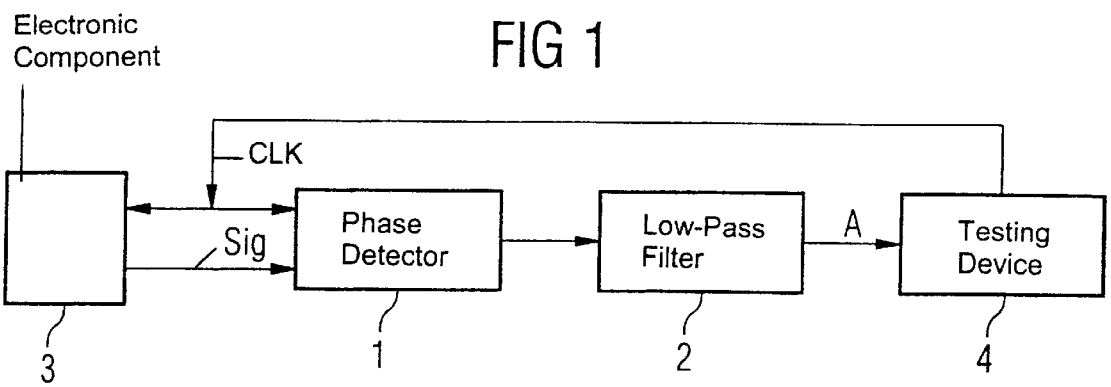
FIG. 1 shows a block diagram of a phase-sensitive element.

Referring now to the figures of the drawing in detail and first, particularly, to FIG. 1 thereof, there is shown a block diagram of a phase-sensitive element. The phase-sensitive element includes a phase detector 1 and a low-pass filter 2 that is connected to the output of the phase detector 1. An external clock signal CLK is fed from a testing device 4 to an electronic component 3 in which the junction temperature is to be measured. The external clock signal CLK is also fed to a first input of the phase detector 1. A periodic signal SIG that is output by the electronic component 3 is applied to a second input of the phase detector 1.

The periodic signal SIG can be generated, for example, in the electronic component 3. It is necessary for the periodic signal SIG to have a fixed frequency and/or phase relationship with respect to the external clock signal CLK. It is also possible, however, to derive the periodic signal SIG from the external clock signal CLK that is applied to the electronic component 3. In this case, the external clock signal CLK will traverse a predetermined signal path of an electronic circuit in the electronic component 3. An output of the electronic circuit then outputs the periodic signal SIG, which is formed by the traversal of the external clock signal CLK through the predetermined signal path, to the second input of the phase detector.

The second-named alternative has the advantage that it is not mandatory to match the signals, since a fixed phase relationship exists between the clock signal CLK and the periodic signal SIG. In the case of the first alternative, in contrast, the internally generated periodic signal builds up independently of the external clock signal CLK, and so it is necessary to match the phases in order to be able to assign the phase shifts produced by changes in the junction temperature to specific junction temperatures.

The phase detector 1 is preferably designed as an exclusive-OR circuit. A periodically pulsed signal (XOR) is present at the output of the phase detector 1, when there is a phase shift between the external clock signal CLK and the internal periodic signal SIG. The length of the periodic pulse at the output of the phase detector 1 corresponds to the phase shift of the two signals, which is determined in accordance with the following formula:

$$\varphi(\text{rad}) = \frac{2\pi \Delta t}{T_0};$$

$\Delta t$ corresponds to the length of time of the pulse;

$\varphi$ corresponds to the phase shift in radians; and $T_0$ corresponds to the clock pulse period.

Figure 2:
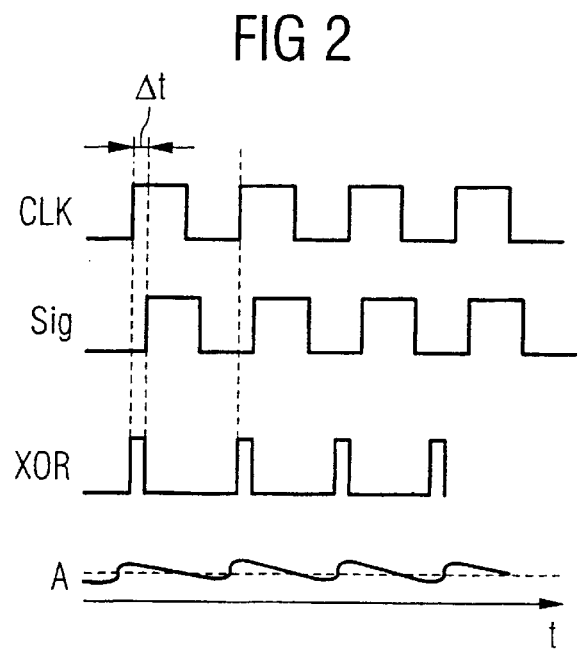
FIG. 2 shows timing diagrams relating to the measurement of the junction temperature in an electronic component.

FIG. 2 illustrates the signal profiles. The signal at the output of the phase detector 1 is formed by the exclusive-or combination of the external clock signal CLK with the internal periodic signal SIG. The pulsed signal XOR is then present at the output of the phase detector 1. In order to determine the junction temperature averaged over the regions of the electronic component 3, it is necessary to determine an average phase shift $\varphi$ between the external clock signal CLK and the internal periodic signal SIG.

Since the pulsed signal XOR frequently contains disturbance variables that are reflected in length differences between the pulses owing to jitter or similar effects, the pulsed signal XOR is averaged. The mean value of the signal XOR is formed by feeding the signal XOR to the low-pass filter 2. The low-pass filter 2 has an output providing a signal A of a constant magnitude. The output signal A can correspond, for example, to a voltage level. The voltage level is higher, the greater the phase shift between the external clock signal CLK and the internal periodic signal SIG. The low-pass filter 2 can preferably be implemented using one or more capacitors.

The mean value of the output signal A is a measure of a mean junction temperature TJ. Because of manufacturing tolerances, it is sensible to calibrate the measurement of the junction temperature before measuring the component parameters during a test of the electronic component 3. The chip to be calibrated is brought to a specific temperature for this purpose before the application of the operating voltage, by setting an ambient temperature. In this case, the component temperature and the junction temperature correspond to the ambient temperature of the component to a good approximation. The external clock signal CLK is now fed, and the electronic component 3 is put into a state in which it outputs the internal periodic signal SIG. The measurement of the phase shift $\varphi$ between the external clock signal CLK and the internal periodic signal SIG is now carried out without delay before the junction temperature can change significantly as a result of the application of the supplied external clock signal CLK or the required supply voltage. The junction temperature can now be determined in the operating state from the measured phase shift by using the calibration curve thus obtained.

Phase measuring units such as, for example, a login amplifier, an analog phase detector used with a step recovery diode, or a digital phase detector can also be used as further possibilities for measuring the phase shift.

The use described above of the phase detector 1 or the low-pass filter 2 is advantageous, in particular, because these elements can be integrated in the electronic component 3, and so the phase shift between the external clock signal CLK and the internal periodic signal SIG can be measured directly using a voltage level at an output of the electronic component. This eliminates the expensive external circuit for measuring the junction temperature. Consequently, there is no need to arrange a phase-sensitive element between the testing device and the module to be tested when performing a test method.

The features of the invention disclosed in the above description and in the drawings, can be provided both individually and in any combination for implementing the invention in its various embodiments.

We claim:

1. A method for measuring a temperature in an integrated semiconductor component, which comprises:

obtaining an internal signal by applying a periodic test signal to a signal path that is internally configured in the semiconductor component;

ensuring that there is a relationship, selected from the group consisting of a frequency relationship and a phase relationship, between the periodic test signal and a periodic external signal;

measuring a phase shift between the internal signal and the external signal; and using the phase shift to determine an average temperature in a component region determined by the signal path.

2. The method according to claim 1, wherein the temperature is a junction temperature in the semiconductor component.

3. The method according to claim 1, which comprises:

applying the external signal to the electronic component; and forming the periodic test signal from the external signal.

4. The method according to claim 1, wherein:

the external signal has a frequency; and the internal signal has the frequency of the external signal.

5. The method according to claim 1, which comprises:

performing the step of measuring the phase shift at a defined ambient temperature; and using the phase shift to tune a measurement of the temperature.

6. The method according to claim 5, which comprises:

performing the step of measuring the phase shift at a time close to applying a supply voltage to the electronic component.

7. The method according to claim 1, which comprises:

using an exclusive-Or-operation to combine the internal signal and the external signal and to thereby form a resulting signal.

8. The method according to claim 7, which comprises:

low-pass filtering the resulting signal.

9. A combination comprising:

an integrated semiconductor component having an internally configured signal path obtaining an internal periodic signal from a periodic test signal applied thereto; and a device for measuring a temperature in said semiconductor component, said device including:
  a phase-sensitive element having a first input receiving an external periodic signal and a second input receiving said internal periodic signal from said semiconductor component,
  said phase-sensitive element having an output providing a variable corresponding to a time-averaged phase shift between said external periodic signal and said internal periodic signal from said semiconductor component,
  the time-averaged phase shift corresponding to an average temperature of a component region determined by the signal path in the electronic component, and
  a relationship, selected from the group consisting of a frequency relationship and a phase relationship, existing between said periodic test signal and said external periodic signal.

10. The combination according to claim 9, wherein:

said phase-sensitive element includes a phase detector and a low-pass filter;

said phase detector has an output connected to said low-pass filter;

said phase detector generates a periodic signal; and said low pass filter converts said periodic signal into an averaged signal that corresponds to the time-averaged phase shift.

11. The combination according to claim 10, wherein said phase detector has an exclusive-Or circuit.

12. The combination according to claim 9, wherein said phase-sensitive element is integrated in said semiconductor component.

* * * * *